(12) United States Patent
Pallerla et al.

(10) Patent No.: US 12,557,015 B2
(45) Date of Patent: Feb. 17, 2026

(54) SAVING BATTERY USAGE ON BATTERY POWERED DEVICES

(71) Applicant: QUALCOMM Incorporated, San Diego, CA (US)

(72) Inventors: Rakesh Pallerla, Hyderabad (IN); Mohamed Sunfeer, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 17/934,405

(22) Filed: Sep. 22, 2022

(65) Prior Publication Data

US 2024/0107449 A1   Mar. 28, 2024

(51) Int. Cl.
| H04W 52/02 | (2009.01) |
| H04W 48/02 | (2009.01) |
| H04W 48/16 | (2009.01) |

(52) U.S. Cl.
CPC ....... *H04W 52/0225* (2013.01); *H04W 48/02* (2013.01); *H04W 48/16* (2013.01); *H04W 52/0261* (2013.01)

(58) Field of Classification Search
CPC . H04W 52/0225; H04W 48/02; H04W 48/16; H04W 52/0261
See application file for complete search history.

(56) References Cited

U.S. PATENT DOCUMENTS

| 10,471,847 B1* | 11/2019 | Han | B60L 3/12 |
| 2015/0044964 A1* | 2/2015 | Khan | H04W 12/065 |
| | | | 455/41.1 |
| 2015/0324798 A1* | 11/2015 | Kai | G06Q 20/145 |
| | | | 705/40 |
| 2016/0189136 A1* | 6/2016 | Mercille | H04W 12/06 |
| | | | 705/44 |
| 2019/0066078 A1* | 2/2019 | Sarin | G06Q 20/38215 |

(Continued)

FOREIGN PATENT DOCUMENTS

| WO | 2007066265 A2 | 6/2007 |
| WO | 2017111962 A1 | 6/2017 |

OTHER PUBLICATIONS

International Search Report and Written Opinion—PCT/US2023/072014—ISA/EPO—Dec. 8, 2023.

*Primary Examiner* — Benjamin H Elliott, IV
*Assistant Examiner* — Tracy Lauren Raimondo
(74) *Attorney, Agent, or Firm* — QUALCOMM Incorporated

(57) ABSTRACT

Systems and techniques are provided for controlling access to an electronic device. For example, a process can include obtaining status information associated with an electronic device. The process can include determining, based on the status information associated with the electronic device, that an access restriction condition associated with the electronic device is met. The process can include generating, based on determining that the access restriction condition associated with the electronic device is met. In some cases, the status information associated with the electronic device includes a battery level of the electronic device. In some aspects, the process includes determining that the access restriction condition is met comprises determining that a battery level of the electronic device is below an access restriction battery threshold.

32 Claims, 11 Drawing Sheets

(56) References Cited

U.S. PATENT DOCUMENTS

2019/0095901 A1* 3/2019 Gosalia ............... G06Q 20/322
2019/0369711 A1* 12/2019 Wang ................... H04W 24/02
2020/0233984 A1 7/2020 Kalenderidis et al.
2021/0349619 A1* 11/2021 Crowley ............... G06F 1/3287

* cited by examiner

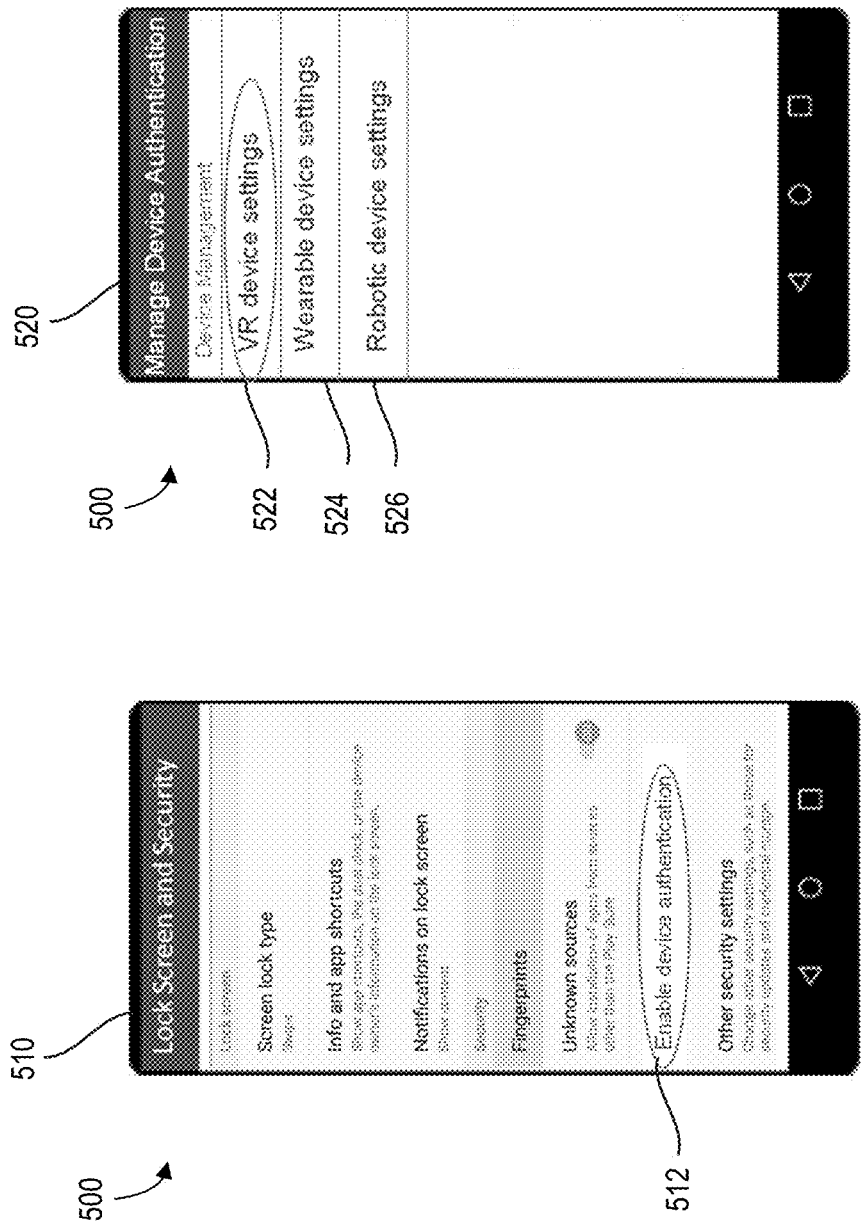

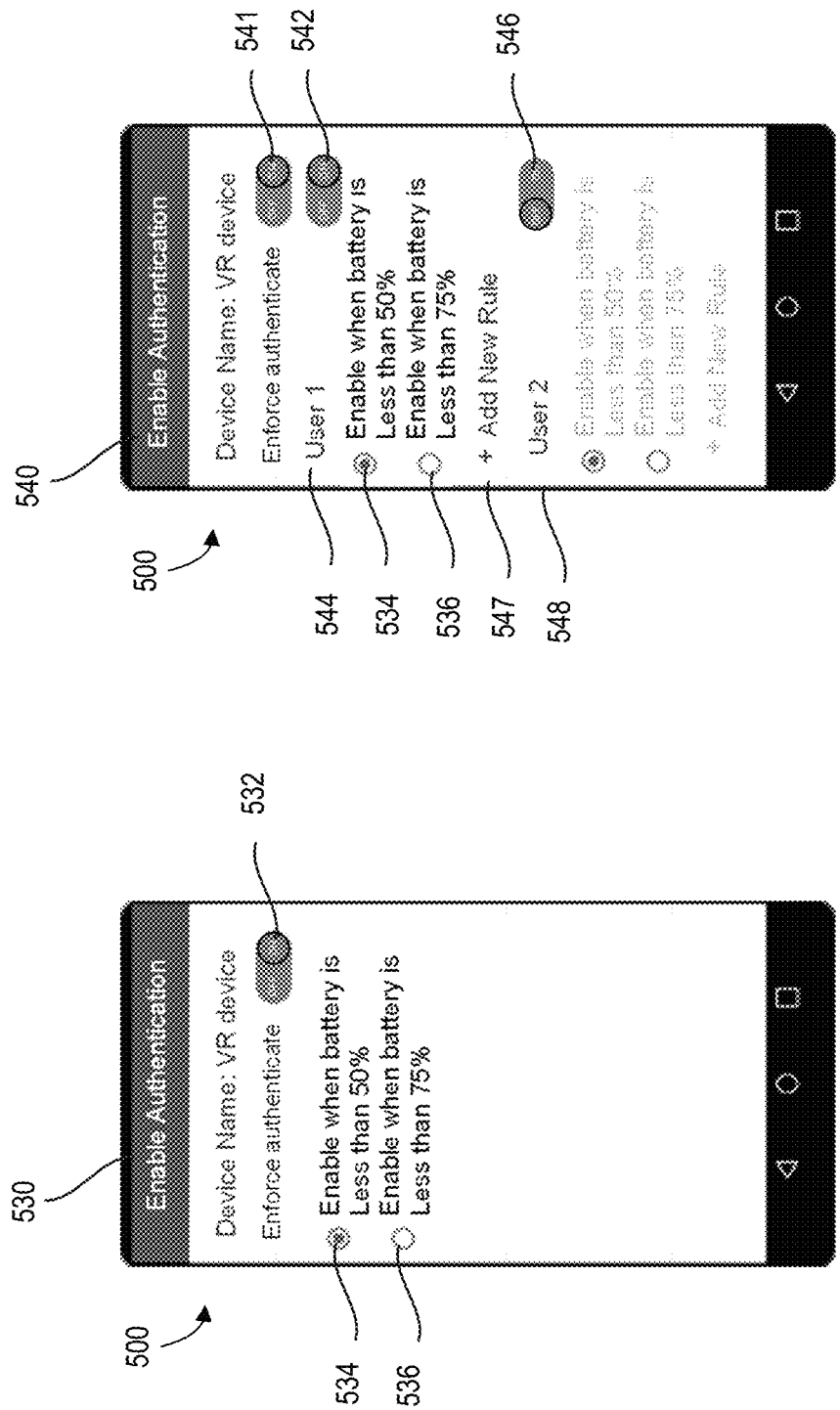

SAVING BATTERY USAGE ON BATTERY POWERED DEVICES

FIELD

The present disclosure generally relates to systems and techniques for saving battery power on battery powered devices.

BACKGROUND

Daily use of smart electronic devices such as cell phones, smart watches, VR headsets, personal assistant robots and other smart devices is becoming increasingly common. In some cases, smart electronic devices can be used by multiple people with limited options for access control or authentication. Unrestricted access can sometimes result in unavailability of a device at a time that the primary user or owner intends to use a specific electronic device for an important purpose. For example, a secondary user may drain available battery power of the specific electronic device without recharging the battery.

SUMMARY

Disclosed are systems, apparatuses, methods, and computer-readable media for controlling access to a smart electronic device. According to at least one example, a method is provided for controlling access to a smart electronic device. The method includes: obtaining status information associated with an electronic device; determining, based on the status information associated with the electronic device, that an access restriction condition associated with the electronic device is met; and generating, based on determining that the access restriction condition associated with the electronic device is met, an access restriction event.

In another example, an apparatus for controlling access to a smart electronic device is provided that includes at least one memory and at least one processor coupled to the at least one memory. The at least one processor is configured to: obtain status information associated with an electronic device; determining, based on the status information associated with the electronic device, that an access restriction condition associated with the electronic device is met; and generating, based on determining that the access restriction condition associated with the electronic device is met, an access restriction event.

In another example, a non-transitory computer-readable medium is provided that has stored thereon instructions that, when executed by one or more processors, cause the one or more processors to: obtain status information associated with an electronic device; determining, based on the status information associated with the electronic device, that an access restriction condition associated with the electronic device is met; and generating, based on determining that the access restriction condition associated with the electronic device is met, an access restriction event.

In another example, an apparatus for controlling access to a smart electronic device is provided. The apparatus includes: means for obtaining status information associated with an electronic device; determining, based on the status information associated with the electronic device, that an access restriction condition associated with the electronic device is met; and generating, based on determining that the access restriction condition associated with the electronic device is met, an access restriction event.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5A through FIG. 5D are diagrams illustrating user interfaces for establishing access restriction conditions, in accordance with some examples of the present disclosure;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a secondary user (e.g., any user other than a registered primary user) of an electronic device can use the smart electronic device without restriction. As a result, in some cases the secondary user can drain available power for the smart electronic device at a time that the primary user requires access. In one illustrative example, the smart electronic device can be a pair of wireless earphones. In some cases, the secondary user may inadvertently drain the battery of the wireless earphones immediately before the primary user needs to use the wireless earphones to participate in a conference call. In another illustrative example, the smart electronic device can be an extended reality (XR) device (e.g., a virtual reality (VR) device, an augmented reality (AR) device, or a mixed reality (MR) device) that the primary user needs to use to participate in a virtual conference.

Figure 1:
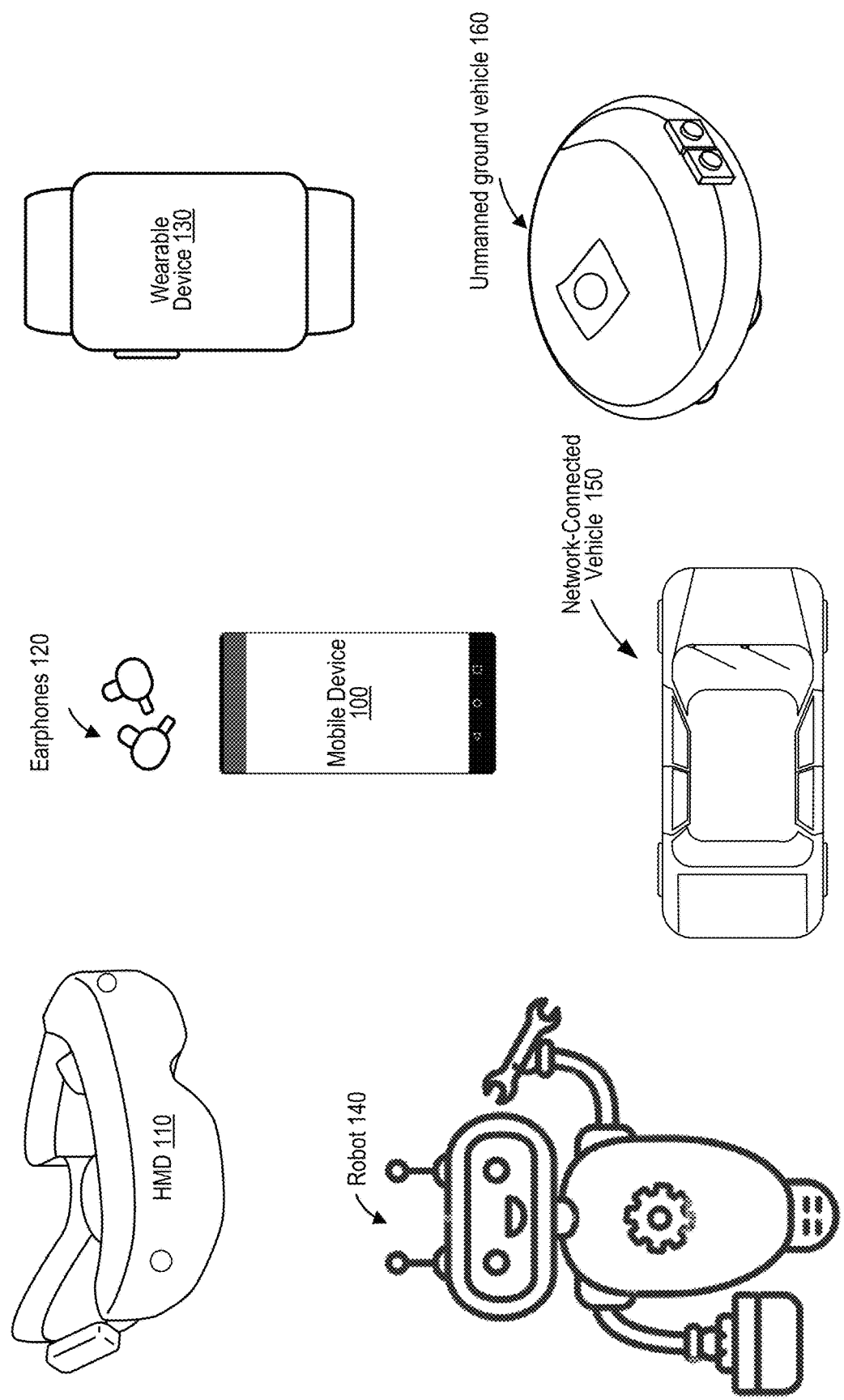
FIG. 1 illustrates example primary and secondary electronic devices, in accordance with some examples.

There is a need for having a solution which limits the use of smart electronic devices without a primary user's consent based on predefined conditions. In some cases, granting and/or revoking access can be conditioned on a remaining battery power level of the smart electronic device. FIG. 1 illustrates example smart electronic devices that can benefit from conditional user access control (e.g., conditioned on remaining battery), such as mobile device 100, head mounted device (HMD) 110 (e.g., an XR device), earphones 120, smart wearable devices 130 (e.g., watches, bands, glasses, or the like), smart robots 140, a network-connected vehicle 150 (e.g., a vehicle with cellular vehicle-to-everything (C-V2X) and/or dedicated short range communication (DSRC) messaging capabilities, such as one or more C-V2X and/or DSCR transceivers), an unmanned ground vehicle 160, and/or other device. Additional example smart electronic devices that can benefit from conditional user access control (not shown in FIG. 1) can include digital assistants, smart speakers, smart portable appliances (e.g., smart vacuums, smart beverage containers, smart refrigerators, smart microwave ovens, or the like), or any other smart devices.

In one illustrative example, a secondary user may be prevented from using a smart electronic device if the battery power level is below a predetermined threshold at the time the secondary user attempts to enable the smart electronic device. In one illustrative example, a primary user may enable access restriction (e.g., restrict access to authenticated users only) if an attempt to enable the smart electronic device occurs while there is less than a first authentication battery level threshold (e.g., when the battery power level is less than 50%). In some cases, the smart electronic device can remain in a low power and/or standby mode until access is restored (e.g., an authentication is received).

In another illustrative example, the smart electronic device may be enabled without access restriction (e.g., an authentication requirement) while the battery power level of the smart electronic device exceeds the first access restriction battery level threshold. However, in some cases, when the battery power level of the smart electronic device falls below the first access restriction battery level threshold, the smart electronic device may have access restrictions. In some cases, the smart electronic device may need an access authorization (e.g., authentication by a primary user of the smart electronic device) before the smart electronic device can be activated. For example, when the smart electronic device is a secondary electronic device, the primary electronic device may generate an authentication request when an attempt to enable the smart electronic device occurs while the battery power level of the smart electronic device falls below the first access restriction battery level threshold. In some cases, once a primary user (e.g., the owner of the primary and secondary electronic devices) grants access (e.g., by performing an authentication), the secondary user can be permitted to use the smart electronic device. As another example, the smart electronic device, instead of a separate primary electronic device, may generate the authentication request and receive the authentication from the primary user.

In some cases, the smart electronic device can be configured with a second access restriction battery power threshold for revoking user access. For example, once the battery power of the smart electronic device falls below the second access restriction battery power threshold, the smart electronic device can enter a standby or low power mode. In some implementations, the smart electronic device may generate a notification indicating that battery power has fallen below the second power threshold. In some cases, the first battery power threshold and the second battery threshold can have a same value (e.g., 40%). In some cases, the first batter power threshold and the second battery threshold can have different values. In some examples, the specific device may only be used again once the primary user authorizes continued use and/or the battery power of the specific device is restored (e.g., through charging).

In some cases, secondary user authentication can be managed through a primary electronic device (e.g., a smart phone, tablet, or the like). For example, a smart electronic device can be paired with the primary device during an initialization process. In some implementations, a primary user of the primary device can enable one or more user authentication conditions for the smart electronic device. Example authentication conditions can include one or more conditions such as battery level of the smart electronic device, time of day, amount of time the smart electronic device has been used since reaching a full charge, or any other condition that can be used to ensure availability of the smart device at a needed time. In one example implementation, the primary device can include a user interface for enabling and/or controlling authentication conditions for one or more smart devices.

Systems and techniques are needed for controlling access of shared smart electronic devices. Systems, apparatuses, processes (or methods), and computer-readable media (collectively referred to as "systems and techniques") are described herein for providing access control based on status information associated with a shared smart electronic device. In some cases, access restriction can be conditionally based on the status information received from the smart electronic device. For example, access control (e.g., access restriction, authentication requirements, or the like) can be conditioned on a battery level included in the status information received from the smart electronic device. In some cases, the status information can include battery level, location, time, user identity, and/or any combination thereof.

Figure 2:
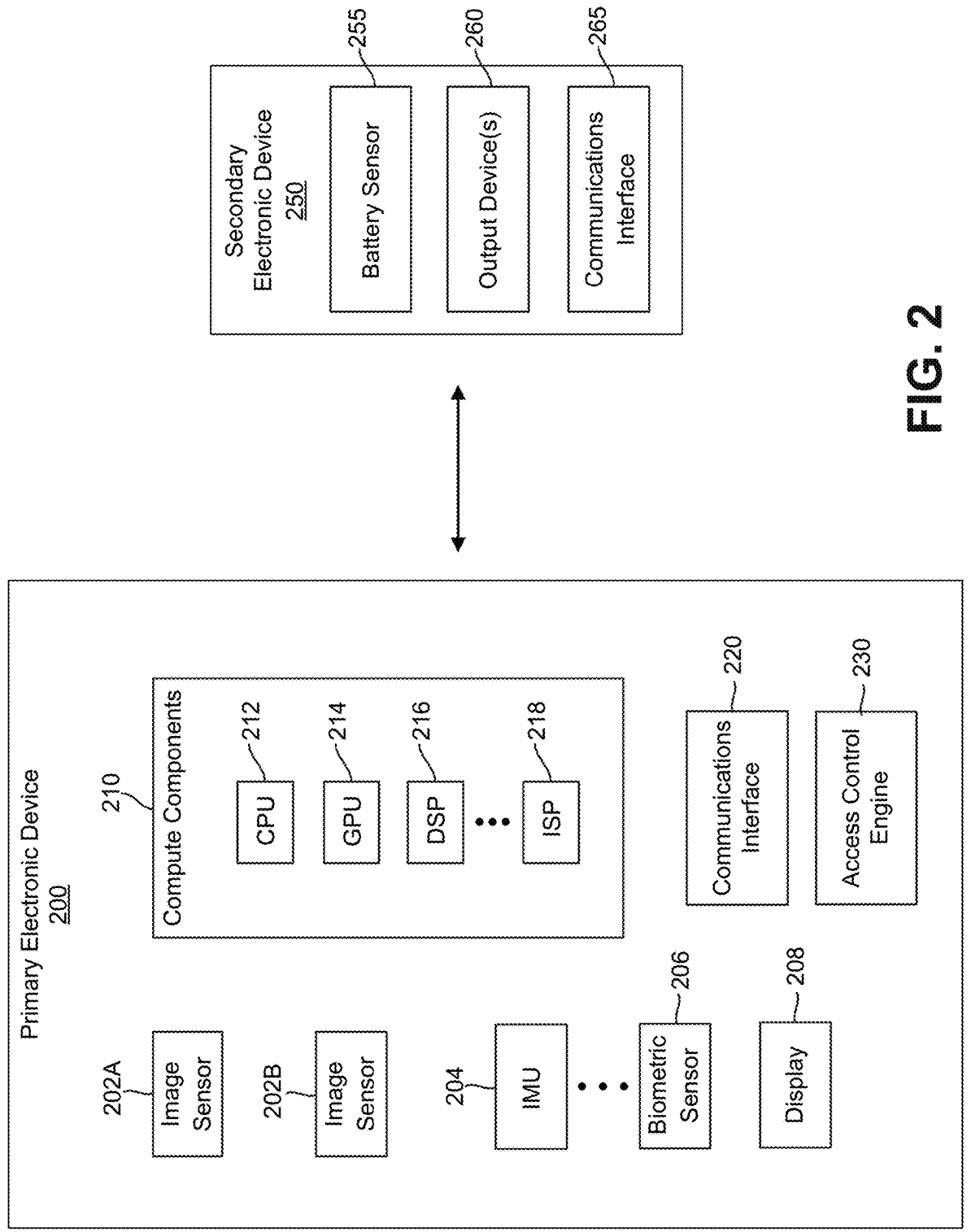
FIG. 2 is a diagram illustrating an example of a primary electronic device 200 used to control access for a secondary electronic device 250, in accordance with some examples of the present disclosure

Various aspects of the techniques described herein will be discussed below with respect to the figures. FIG. 2 is a diagram illustrating an example of a primary electronic device 200 used to control access for a secondary electronic device 250, in accordance with some examples of the present disclosure. The primary electronic device 200 can be used to control the secondary electronic device 250 using techniques described herein. The secondary electronic device 250 can include an IoT/smart device such as, for example and without limitation, a smart wearable device (e.g., a smart watch, ring, bracelet, glove, medical/fitness tracker, wireless earphones, etc.), a smart lock, a smart bicycle, a smart security system, a smart light, a smart hub, a smart camera, a smart refrigerator, a smart speaker, a smart medical sensor, a smart television, a smart thermostat, a robotic vacuum cleaner, a mobile computing device (e.g., a laptop computer, a tablet computer, a smartphone, etc.), a video game system, a global positioning system (GPS) device, a smart alarm, a smart scanner, a connected appliance, smart equipment, an embedded system, a smart home device, or any other smart, connected, and/or wireless device.

The primary electronic device 200 and the secondary electronic device 250 can be communicatively coupled to allow the primary electronic device 200 to control the secondary electronic device 250, as further described herein. In some examples, the primary electronic device 200 can implement one or more applications such as, for example and without limitation, an application for managing and/or controlling access to computing devices (e.g., secondary electronic device 250), a smart home application, a video game application, a robotic application, an autonomous driving or navigation application, a productivity application, a social media application, a communications application, a media application, an electronic commerce application, and/or any other application.

In some examples, the primary electronic device 200 can include an electronic device configured to use information about the relative pose of the primary electronic device 200 and/or the secondary electronic device 250 to provide one or more functionalities, such as device management and/or control functionalities, gaming functionalities, autonomous driving or navigation functionalities, computer vision functionalities, robotic functions, XR functionalities (e.g., tracking, detection, classification, mapping, content rendering, etc.), etc. For example, the primary electronic device 200 can be mobile communications device (e.g., a smartphone, a cellular telephone).

In the illustrative example shown in FIG. 2, the primary electronic device 200 can include one or more image sensors, such as image sensors 202A and 202B (collectively "202" hereinafter), an inertial measurement unit (IMU) 204, a display 208, one or more compute components 210, a communications interface 220, and an access control engine 230. The primary electronic device 200 can optionally include a biometric sensor 206 for sensing biometric features (e.g., fingerprints, facial features, eye recognition features, voice recognition features, etc.) and/or other sensors. In some examples, the primary electronic device 200 can include one or more other sensors such as, for example and without limitation, a radar, a light detection and ranging (LIDAR) sensor, a pressure sensor (e.g., a barometric air pressure sensor and/or any other pressure sensor), a gyroscope, an accelerometer, a magnetometer, and/or any other sensor. In some examples, the primary electronic device 200 can include additional sensors and/or components such as, for example, a light-emitting diode (LED) device, a storage device, a cache, a communications interface, a display, a memory device, etc. An example architecture and example hardware components that can be implemented by the primary electronic device 200 are further described below with respect to FIG. 8.

The primary electronic device 200 can be part of, or implemented by, a single computing device or multiple computing devices. In some examples, the primary electronic device 200 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s). In some implementations, the image sensors 202, the IMU 204, the biometric sensor 206, the display 208, the one or more compute components 210, the communications interface 220, and/or the access control engine 230 can be part of the same computing device.

For example, in some cases, the image sensors 202, the IMU 204, the biometric sensor 206, and/or the one or more compute components 210 can be integrated with or into a camera system, a smartphone, a laptop, a tablet computer, a smart wearable device, an XR device such as an HMD, an IoT device, a gaming system, and/or any other computing device. However, in other implementations, the image sensors 202, the IMU 204, the biometric sensor 206, and/or the one or more compute components 210 can be part of, or implemented by, two or more separate computing devices.

The one or more compute components 210 of the primary electronic device 200 can include, for example and without limitation, a central processing unit (CPU) 212, a graphics processing unit (GPU) 214, a digital signal processor (DSP) 216, and/or an image signal processor (ISP) 218. In some examples, the primary electronic device 200 can include other types of processors such as, for example, a computer vision (CV) processor, a neural network processor (NNP), an application-specific integrated circuit (ASIC), a field-programmable gate array (FPGA), etc. The primary electronic device 200 can use the one or more compute components 210 to perform various computing operations such as, for example, extended reality operations (e.g., tracking, localization, object detection, classification, pose estimation, mapping, content anchoring, content rendering, etc.), device control operations, image/video processing, graphics rendering, machine learning, data processing, modeling, calculations, and/or any other operations.

In some cases, the one or more compute components 210 can include other electronic circuits or hardware, computer software, firmware, or any combination thereof, to perform any of the various operations described herein. In some examples, the one or more compute components 210 can include more or less compute components than those shown in FIG. 2. Moreover, the CPU 212, the GPU 214, the DSP 216, and the ISP 218 are merely illustrative examples of compute components provided for explanation purposes.

The image sensors 202 can include any image and/or video sensor or capturing device, such as a digital camera sensor, a video camera sensor, a smartphone camera sensor, an image/video capture device on an electronic apparatus such as a television or computer, a camera, etc. In some cases, the image sensors 202 can be part of a camera or computing device such as a digital camera, a video camera, an IP camera, a smartphone, a smart television, a game system, etc. Moreover, in some cases, the image sensors 202 can include multiple image sensors, such as rear and front sensor devices, and can be part of a dual-camera or other multi-camera assembly (e.g., including two camera, three cameras, four cameras, or other number of cameras).

In some examples, each image sensor of the image sensors 202 a can capture image data and generate frames based on the image data and/or provide the image data or frames to the one or more compute components 210 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 210 can processing operations based on data from one or more of the image sensors 202, the IMU 204, the biometric sensor 206, the communications interface 220, the access control engine 230, and/or the secondary electronic device 250. For example, in some cases, the one or more compute components 210 can perform image processing, gesture detection, gesture recognition, data processing, user access management, user authentication, and/or other operations based on data from the image sensors 202, the IMU 204, the biometric sensor 206, the access control engine 230, the communications interface 220, the access control engine 230, and/or the secondary electronic device 250. In some cases, the one or more compute components 210 can generate images and/or video frames to be displayed by the display 208.

In some cases, the primary electronic device 200 can include communications interface 220, which can generally govern and manage the user input and system output of the primary electronic device 200. In some examples, the communications interface 220 may perform or facilitate receipt and/or transmission wired or wireless communications using wired and/or wireless transceivers. The communications interface 220 may also include one or more Global Navigation Satellite System (GNSS) receivers or transceivers that are used to determine a location of the primary electronic device 200 based on receipt of one or more signals from one or more satellites associated with one or more GNSS systems. In one illustrative example, the communications interface 220 can correspond to the communications interface 840 of FIG. 8.

In some cases, the IMU 204 can detect an acceleration, angular rate, and/or orientation of the primary electronic device 200 and generate measurements based on the detected acceleration. In some cases, the IMU 204 can detect and measure the orientation, linear velocity, and/or angular rate of the primary electronic device 200. For example, the IMU 204 can measure the pitch, roll, and yaw of the primary electronic device 200. In some examples, the primary electronic device 200 can use measurements obtained by the IMU 204 and/or image data from one or more of the image sensors 202 to calculate the relative pose of the primary electronic device 200.

The primary electronic device 200 can optionally implement the biometric sensor 206 to capture biometric data of one or more users to authenticate/verify the one or more users based on biometric data. In some examples, the primary electronic device 200 can use the biometric sensor 206 to capture biometric features from one or more users (e.g., a primary user) and use biometric data captured to control or limit a control of the secondary electronic device 250, as further explained herein. For example, the primary electronic device 200 can use biometric data from the biometric sensor 206 to limit control of the secondary electronic device 250 through the primary electronic device 200 conditioned on at least one or more of battery level of the secondary device, location of the secondary device, time (e.g., relative to a scheduled use of the secondary device by the primary user), identity of a user of the secondary device (e.g., a secondary user), and/or any combination thereof.

The user access control engine 230 can be used to control access to the secondary electronic device 250 under specified conditions. For example, the access control engine 230 can be configured to prevent a secondary user from accessing the secondary electronic device 250 when the battery level is below a first battery threshold level. In some cases, the primary electronic device 200 can grant access to the secondary device after the secondary user access is restricted and while the battery level is below the first battery level. In one illustrative example, a primary user of the secondary device can authorize the secondary user of the secondary device by performing an authentication (e.g., a fingerprint, personal identification number (PIN) or the like. In some cases, the user access control engine 230 can provide a user interface (e.g., by the display 208) for a user of the primary electronic device 200 (e.g., a primary user) to establish conditions for controlling access to the secondary electronic device 250.

In the illustrative example shown in FIG. 2, the secondary electronic device 250 includes a battery sensor 255. In some cases, the battery sensor can sense the battery level of one more batteries (not shown) of the secondary electronic device 250. In some implementations, the battery sensor 255 can measure voltage, current, and/or temperature of the one or more batteries. In some aspects, the battery level can include at least one or more of the voltage, current and/or temperature of the one or more batteries.

The output device(s) 260 can include one or more sensors and/or components such as, for example and without limitation, a display, a speaker, a microphone, an image sensor, an LED device, a pressure sensor, an IMU, a light-emitting device, etc.

In the illustrative example of FIG. 2, the secondary electronic device 250 includes a communications interface 265, which can generally govern and manage the user input and system output of the secondary electronic device 250. In some examples, the communications interface 265 may perform or facilitate receipt and/or transmission wired or wireless communications using wired and/or wireless transceivers. The communications interface 265 may also include one or more GNSS receivers or transceivers that are used to determine a location of the primary electronic device 200 based on receipt of one or more signals from one or more satellites associated with one or more GNSS systems. In one illustrative example, the communications interface 265 can correspond to the communications interface 840 of FIG. 8. In some cases, the secondary electronic device 250 can utilized the communications interface 265 to transmit battery level data (e.g., from the battery sensor 255), location data (e.g., from GNSS receivers and/or transceivers of the communications interface 265), and/or any other system information (e.g., user identity of a user of the secondary device) to the primary electronic device 200.

The components shown in FIG. 2 with respect to the primary electronic device 200 and the secondary electronic device 250 are merely illustrative examples provided for explanation purposes. In other examples, the primary electronic device 200 and/or the secondary electronic device 250 can include more or fewer components than those shown in FIG. 2. While the primary electronic device 200 and the secondary electronic device 250 are shown to include certain components, one of ordinary skill will appreciate that the primary electronic device 200 and the secondary electronic device 250 can include more or fewer components than those shown in FIG. 2. For example, the primary electronic device 200 and/or the secondary electronic device 250 can also include, in some instances, one or more other memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 2. As another example, the secondary electronic device 250 may include an access control engine (not shown). An illustrative example of a computing device and/or hardware components that can be implemented with the primary electronic device 200 and/or the secondary electronic device 250 are described below with respect to FIG. 8.

Figure 3:
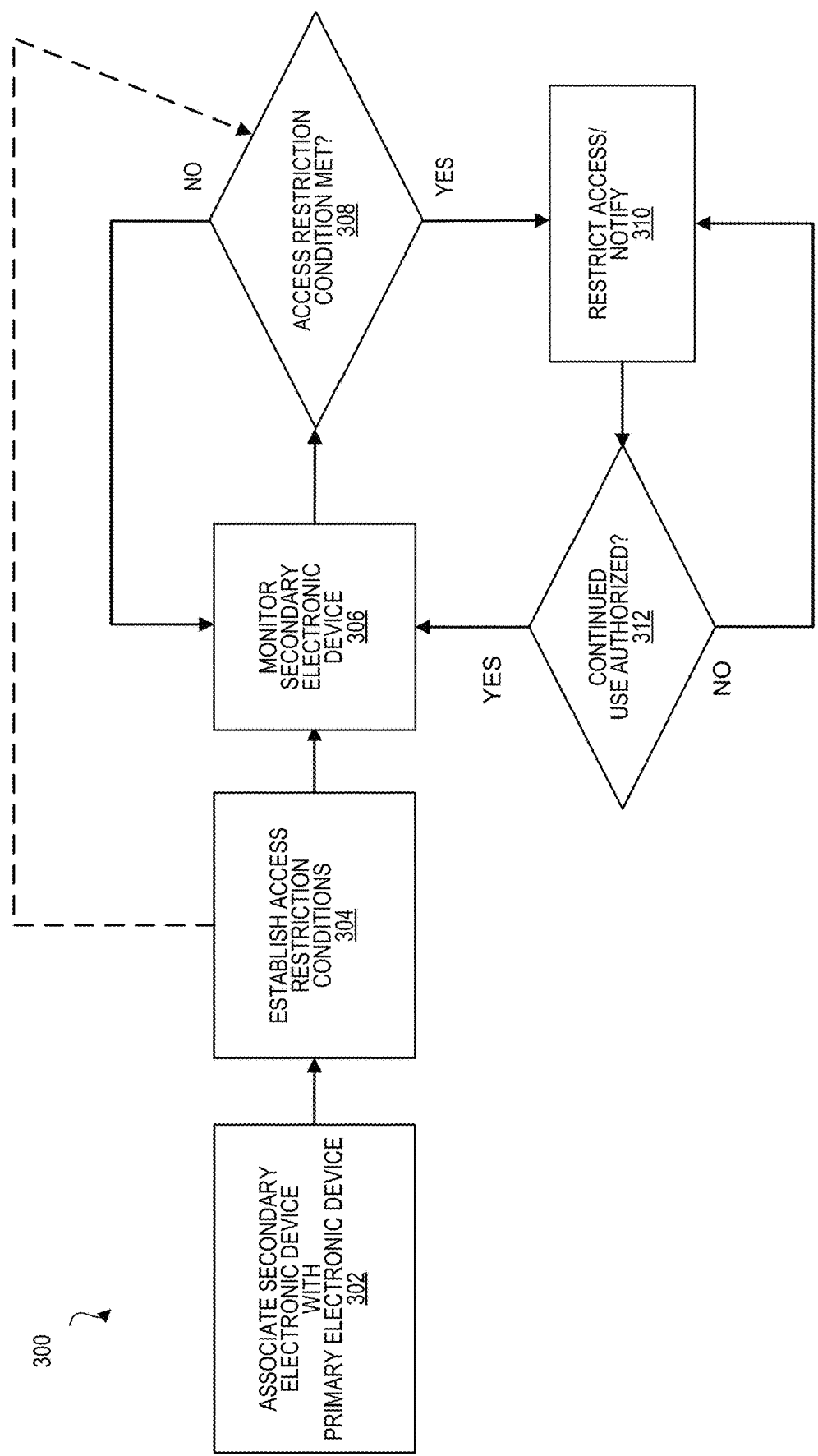
FIG. 3 is a flow diagram illustrating an example process 300 for controlling access to an electronic device, in accordance with some examples of the present disclosure.

FIG. 3 illustrates an example process 300 for controlling access to an electronic device. In some cases, the process 300 can be performed by the access control engine 230 of the primary electronic device 200. At block 302, the process 300 can associate a secondary device (e.g., secondary electronic device 250 of FIG. 2) with a primary device (e.g., primary electronic device 200 of FIG. 2) and/or a primary user. For example, many smart electronic devices require an initial pairing with a primary electronic device (e.g., a smart phone) for an initial setup.

Figure 4A:
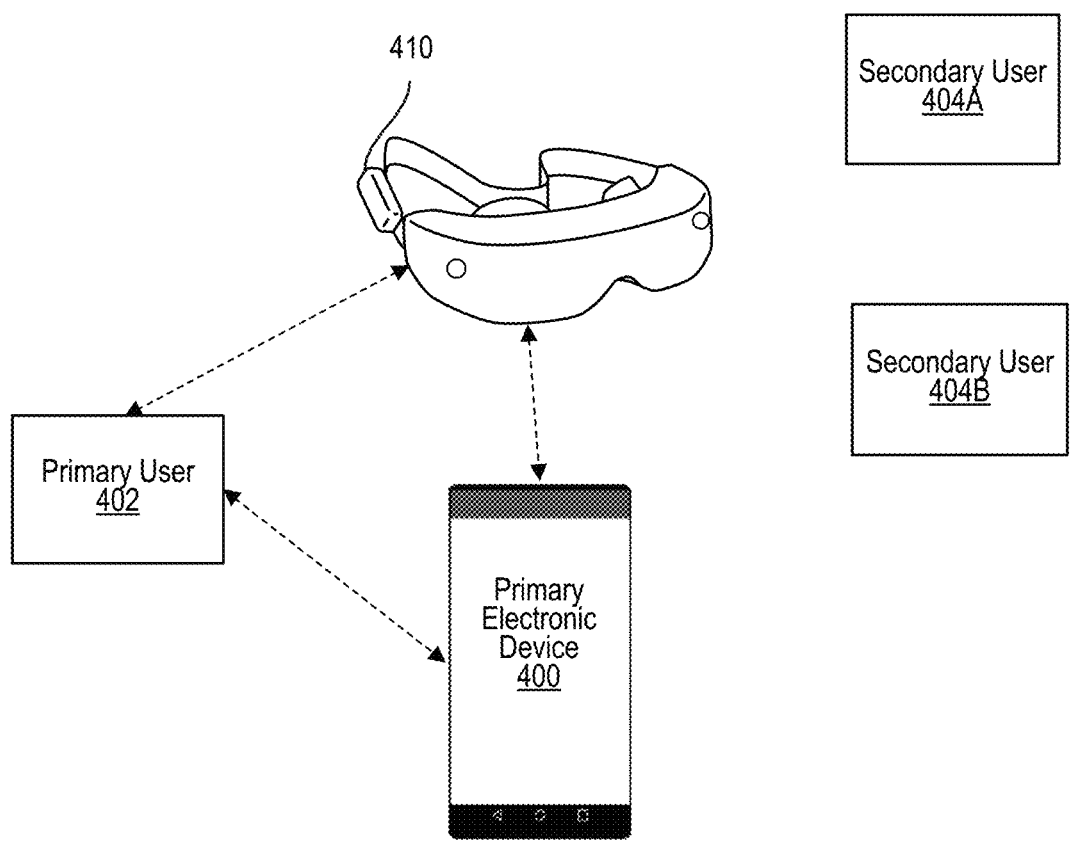
FIG. 4A is a diagram illustrating an initial pairing of a secondary electronic device with a primary electronic device, in accordance with some examples of the present disclosure.

Referring to FIG. 4A, a block diagram representing an initial pairing (e.g., a communications link between a secondary electronic device 410 and a primary electronic device 400 is shown. In the illustrative example of FIG. 4A, the primary electronic device 400 is depicted as a mobile telephone and the secondary electronic device 410 is depicted as an HMD. However, any suitable primary electronic device (e.g., computer) can be used. As illustrated in FIG. 4A, the primary electronic device 400 can be associated with a primary user (e.g., an owner of the primary electronic device 400). During the pairing process, the primary electronic device 400 and the secondary electronic device 410 can establish a communications link (e.g., via the communications interface 220 and/or the communications interface 265 of FIG. 2) and the secondary electronic device 410 can be associated with the primary electronic device 400 as a primary electronic device associated with the secondary electronic device 410. In some cases, the secondary electronic device 410 can be associated with the primary user 402 as a primary user of the electronic device. As used herein, a primary electronic device (e.g., primary electronic device 400) and/or primary user (e.g., primary user 402) associated with a secondary electronic device (e.g., secondary electronic device 410) can correspond to a device and/or user that has unrestricted access to the secondary electronic device 410. As illustrated in FIG. 4A, the dashed lines between the primary electronic device 400 and the secondary electronic device 410 as well as the dashed lines between the primary user 402 and the secondary electronic device 410 can be indicative of the primary electronic device and/or primary user associations as described above. As illustrated in FIG. 4A, at the time of initial setup, the secondary electronic device 410 may not be associated with any secondary users 404A, 404B.

Figure 4B:
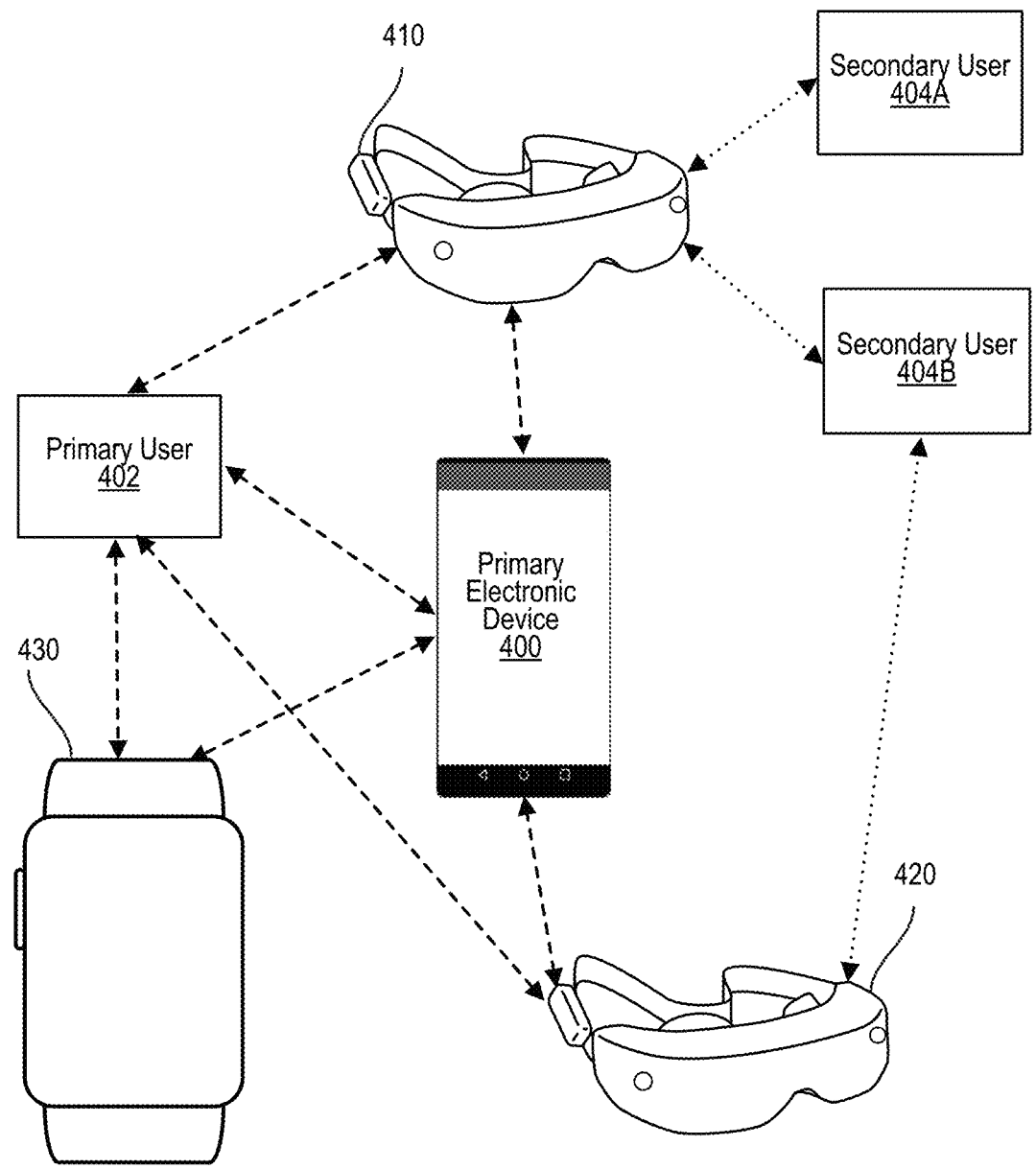
FIG. 4B is a diagram illustrating associations between primary users, primary electronic devices, secondary users, and secondary electronic devices, in accordance with some examples of the present disclosure.

Referring to FIG. 4B, the process 300 can establish a relationship between the primary electronic device 400 and/or the primary user 402 and additional secondary electronic devices 420, 430. In the illustrated example of FIG. 4B, the secondary electronic device 420 is shown as a second HMD and the secondary device 430 is depicted as a smart wearable device (e.g., a smart watch). As illustrated by the dashed arrows of FIG. 4B, the process 300 can associate the primary electronic device 400 and/or the primary user 402 as the primary electronic device and/or primary user of multiple secondary electronic devices 410, 420, 430. As further illustrated by dotted lines in FIG. 4B, the secondary electronic device 410 can be associated with two secondary users 404A, 404B. As used herein, a secondary user can correspond to a device and/or user that has restricted access to the secondary electronic device 410. As illustrated, secondary devices can be associated with multiple secondary users (e.g., secondary electronic device 410), a single secondary user (e.g., additional secondary electronic devices 420) or no secondary users (e.g., additional secondary electronic devices 430).

Returning to FIG. 3, at block 304, the process 300 includes establishing access restriction conditions for the secondary electronic device (e.g., secondary electronic device 410 of FIG. 4A and FIG. 4B). In some cases, the primary electronic device (e.g., primary electronic device 400 of FIG. 4A and FIG. 4B) and/or the primary user (e.g., primary user 402 of FIG. 4A and FIG. 4B) associated with the secondary electronic device can customize access restriction conditions for one or more secondary devices. In some implementations, the access restriction conditions can be customized through a user interface (e.g., displayed on display 208 of FIG. 2) of the primary electronic device.

In some cases, the access restriction conditions can be maintained on the primary electronic device. For example, in some cases, the secondary electronic device may not be configured to store the access restriction conditions in memory. In some cases, the access restriction conditions can be transmitted from the primary electronic device to the secondary electronic device.

FIG. 5A through FIG. 5D provide illustrative examples of a user interface (e.g., displayed on display 208 of FIG. 2) of a primary electronic device 500 for establishing user access restriction conditions for one or more secondary devices. As illustrated in FIG. 5A, a user interface 510 can include access control selection 512 for enabling access restriction using device authentication. In some cases, when access control selection 512 is selected (as indicated by an oval) in the user interface 510, a second user interface 520 can be displayed on the display of the primary electronic device 500.

In the illustrated example of FIG. 5B, the second user interface 520 includes a list of VR device settings 522, wearable device settings 524, and robotic device settings 526. In some implementations, the device settings 522, 524, 526 can correspond to secondary devices associated with the primary electronic device 500 as described with respect to block 302 of process 300. In some cases, when VR device settings 522 is selected (as indicated by an oval), a third user interface 530 can be displayed on the display of the primary electronic device 500. FIG. 5C illustrates an example third user interface including authentication options for the VR device (e.g., HMD 110 of FIG. 1, HMD 410 of FIG. 4A and FIG. 4B).

In the illustrated example of FIG. 5C, the third user interface 530 includes an enforce authenticate on/off toggle 532, a first battery threshold option 534, and a second battery threshold option 536. In the illustrated example, enforce authenticate on/off toggle 532 is shown in the on position, and the third user interface includes radio buttons that can be used to select between first battery threshold option 534 and second battery threshold option 536. In the illustrated example, the first battery threshold option 534 provides an option to enforce authentication when the battery level of the VR device is less than 50%. As shown, the second battery threshold option 536 provides an option to enforce authentication when the battery level of the VR device is less than 75%. In some implementations, the battery threshold level of first battery threshold option 534 and second battery threshold option 536 can indicate that a secondary user can use the VR device without authentication as long as the battery level is above the selected battery threshold level. In some cases, the selected battery threshold option can indicate that the secondary device will enter a standby mode (e.g., a low power mode) once the selected threshold battery level is reached and will remain in the standby mode until the primary electronic device 500 and/or primary user authenticates continued use on the VR device. In some cases (not shown), the battery threshold level for requiring authentication to use the VR device (e.g., a first battery threshold) and the battery threshold level for placing the secondary device in the standby mode (e.g., a second battery threshold) can be different.

FIG. 5D illustrates a fourth user interface 540 that includes additional options for controlling authentication of the secondary device. In the example of FIG. 5D, authentication settings 544 are provided for a first secondary user (also referred to herein as User 1) and separate authentication settings 548 are provided for a second secondary user (also referred to herein as User 2). For example, User 1 and User 2 can correspond to secondary users 404A, 404B and the VR device can correspond to secondary electronic device 410 of FIG. 4B and primary electronic device 500 can correspond to primary electronic device 400 of FIG. 4B. In the illustrated example, the fourth user interface 540 includes a global enforce authenticate on/off toggle 541 as well as individual user enforce authenticate toggles 542, 546 corresponding to User 1 and User 2, respectively. As shown, the global enforce authenticate on/off toggle 541 and the individual user enforce authenticate toggle 542 are set to the on position, while the individual user authenticate toggle 546 is set to the off position. As illustrated, the authentication settings 548 for the second user can be disabled corresponding to the individual user enforce authenticate toggle 546 being in the off position. In the configuration of FIG. 5D, the fourth user interface 540 provides authentication settings 544 for the first user for selecting between the first battery threshold option 534 and the second battery threshold option 536. In some cases, an add new rule option 547 can be used to create additional conditions for controlling access to the VR device (e.g., by enforcing authentication). The additional conditions can correspond to system information provided by the secondary device (e.g., by communications interface 265). For example, the system information can include the battery level, user identity of the secondary user, a location of the secondary electronic device (e.g., the VR device), or any other system information provided by the secondary electronic device.

Returning to FIG. 3, at block 306, the process 300 can monitor status of the secondary electronic device or devices (e.g., secondary electronic device 410, additional secondary electronic devices 420, additional secondary electronic devices 430 of FIG. 4B). For example, each of the secondary electronic devices associated with the primary device can send system information (e.g., through communications interface 265 of FIG. 2) to the primary electronic device.

At block 308, the process 300 can determine if one or more access restriction conditions associated with each of the individual secondary electronic devices is met. In some cases, the process 300 can compare the system information (e.g., battery level, user identity, location) obtained by the process 300 from each secondary electronic device with one or more access restriction conditions (e.g., battery threshold, location restrictions, restricted users). A dashed line between block 304 and block 308 indicates that the comparison at block 308 can be updated to reflect changes to the access restriction conditions (e.g., by user interfaces 510, 520, 530, and/or 540 of FIG. 5A through FIG. 5D). In some cases, if the process 300 determines that no access restriction conditions are met for a particular secondary device, the process 300 can return to block 306.

In some cases, access restriction conditions can be applied to restrict access to the secondary electronic device while the secondary electronic device 410 is being used by a particular secondary user. In some cases, if the secondary electronic device 410 is not paired with the primary electronic device when an access restriction condition is met, the secondary electronic device may be configured to determine that the access restriction condition is met.

In one illustrative example, the process 300 can determine that an access restriction condition is met when a user of the particular secondary electronic device first attempts to use the particular secondary electronic device. For example, if the process 300 determines that the battery level of the particular secondary electronic device 610 is below a first authentication battery threshold at the time the secondary user attempts to the use the particular secondary electronic device, the process 300 can proceed to block 310.

In some cases, the secondary user may start using the particular secondary electronic device while the battery level of the particular secondary electronic device is above the first authentication threshold. In some cases, the process 300 can determine that an access restriction condition is met when the battery level of the particular secondary electronic device falls below a second authentication battery threshold during use. In some cases, the first authentication threshold can be equal to the second authentication threshold. For example, the first battery authentication threshold and the second authentication threshold can be set to 50%. As a result, the process 300 can determine that an access restriction condition is met if a secondary user attempts to initiate use of the particular secondary electronic device 610 while the battery level is below 50% and/or if the secondary user initiates use of the particular secondary electronic device 610 while the battery level is above 50% and as a result of using the particular secondary electronic device 610 the battery level falls below 50%.

In some implementations, the first authentication threshold and the second authentication threshold can be different. For example, the first authentication threshold can be 50% and the second authentication threshold can be 30%. As a result, if the secondary user initiates use of the particular secondary electronic device 610 while the battery level is below 50%, the process 300 can proceed to block 310. However, if the secondary user initiates use or the particular secondary electronic device 610 while the battery level is above 50% and as a result of using the particular secondary electronic device 610 the battery level falls below 50% (e.g., the first authentication threshold), the process 300 may not determine that an access restriction condition is met. In some cases, as a result of using the secondary device, if the battery level falls below 30% (e.g., the second authentication threshold), the process 300 may determine that the access restriction condition is met.

In some cases, a determination of whether an access restriction condition is met may be based on a combination of conditions. For example, when there are two or more secondary electronic devices of the same type (e.g., the secondary electronic devices 410 and 420 in FIG. 4B) that are associated with the primary electronic device (e.g., primary electronic device 400 of FIG. 4B), the access restriction condition for one of the secondary electronic devices is not met unless the two or more the secondary electronic devices that are associated with the primary electronic device all have battery levels below an authentication threshold.

In some examples, if the process 300 determines that an access restriction condition is met for the particular secondary electronic device, the process 300 can proceed to block 310.

Figure 6A:
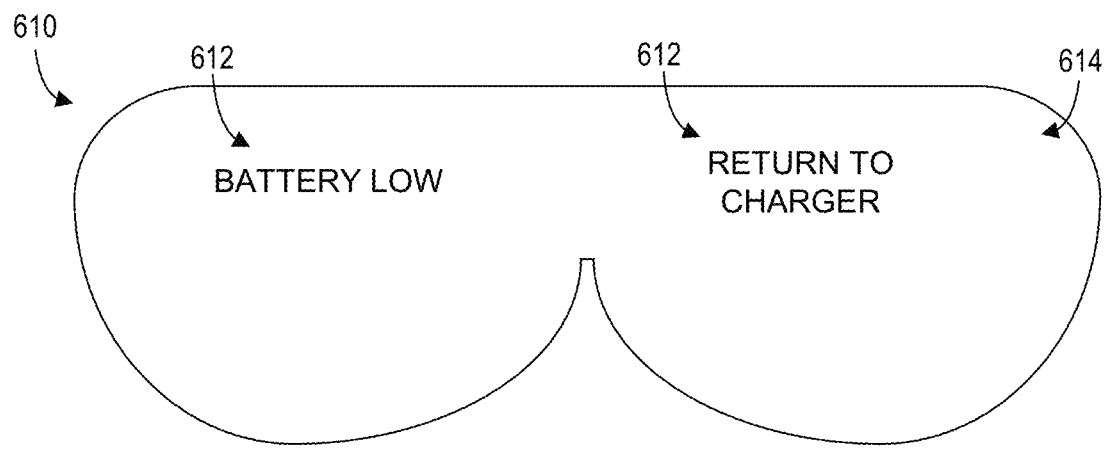
FIG. 6A is a diagram illustrating an example access restriction event, in accordance with some examples of the present disclosure.

At block 310, the process 300 can generate an access restriction event for the particular secondary electronic device that met the access restriction condition determined at block 308. FIG. 6A illustrates an example access restriction event that includes providing a notification 612 to the particular secondary electronic device 610 that battery power is low. In the illustrated example of FIG. 6A, the particular secondary electronic device 610 is shown as an HMD (e.g., HMD 110 of FIG. 1). FIG. 6A illustrates an example notification 612 that can be provided to the particular secondary electronic device 600. As illustrated, the notification 612 can be displayed on a display 614 of the particular secondary electronic device 610. In some cases, when a notification threshold battery level for the particular secondary electronic device 610 is met, the process 300 can provide the notification 612 while allowing continued use of the particular secondary electronic device 610.

Figure 6B:
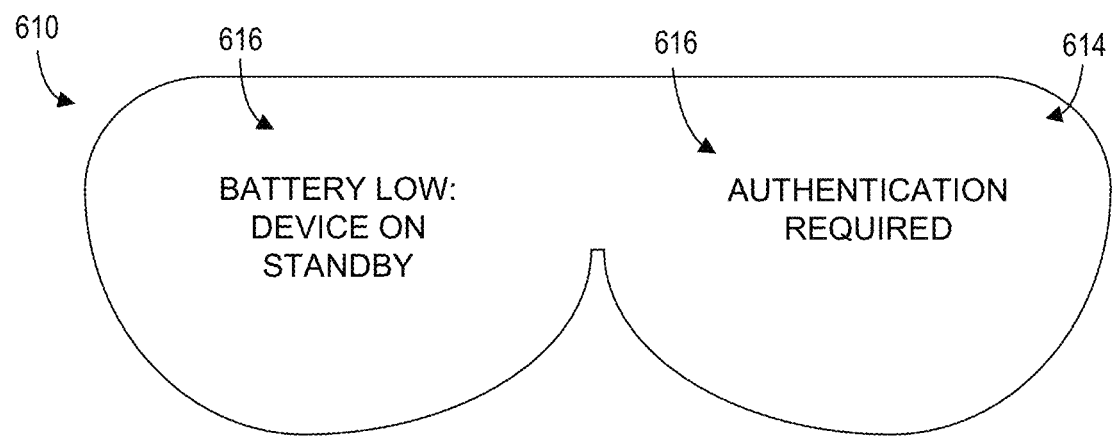
FIG. 6B is a diagram illustrating another example access restriction event, in accordance with some examples of the present disclosure.

FIG. 6B illustrates an example access restriction event 616 generated by the process 300 that disables continued use of the particular secondary electronic device 610 until the process 300 provides an authentication to the particular secondary electronic device 610. As illustrated in FIG. 6B, the access restriction event 616 can include displaying a notification on the display 614 of the particular secondary electronic device 600. In the illustrative example of FIG. 6B the notification informs the secondary user that the particular secondary electronic device 610 is in a standby mode and that authentication is required.

Returning to FIG. 3, after the process 300 generates an access restriction event, the process can proceed to block 312. At block 312, the process 300 can determine whether continued use of the secondary device is authorized. In some cases, such as the notification 612 of FIG. 6A, the process 300 can generate a notification without disabling use of the particular secondary device (e.g., particular secondary electronic device 610 of FIG. 6A and FIG. 6B). As a result, the process 300 can determine that continued use is authorized and return to block 306.

Figure 6C:
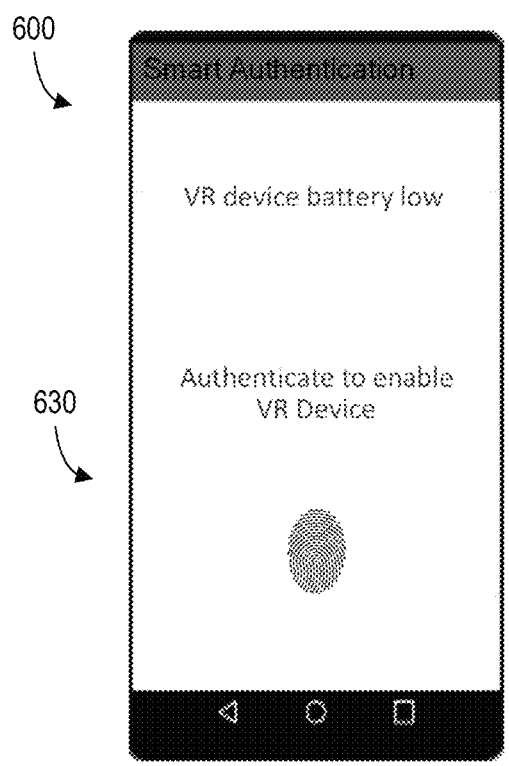
FIG. 6C is a diagram illustrating a user authentication, in accordance with some examples of the present disclosure.

In some cases, such as the access restriction event 616 of FIG. 6B, the process 300 can determine whether the process 300 has obtained a user authentication for the secondary user to continue using the particular secondary device. FIG. 6C illustrates an example of a user authentication user interface 630 that can provide user authentication to the process 300. In the illustrated example of FIG. 6C, the user authentication is illustrated as a fingerprint detected by the primary electronic device 600. However, the user authentication can be provided by entering a pin, other biometric information (e.g., voice identification, facial recognition, or the like) and/or any other suitable authentication technique. If the process 300 has not obtained the required user authentication the process 300 can return to block 310 and continue restricting access to the particular secondary device until the user authentication is obtained. In some cases, if the process 300 obtains the user authentication event, the process 300 can allow the secondary user to continue using the particular secondary device and return to block 306.

As noted above, the process 300 and related techniques described herein can allow a system to control access to electronic devices that may be shared by multiple users. For instance, a primary electronic device and/or primary user may establish access restriction conditions for one or more secondary electronic devices. In some cases, each secondary electronic device can be provided with separately controllable access restriction conditions. In some implementations, access restriction conditions can be personalized for each individual secondary user of a particular secondary electronic device. For example, a primary user may provide unrestricted access to a spouse while providing access restriction for one or more children. In some cases, the access restriction for individual children may also be separately controlled.

In the example described the process 300 is described from the perspective of the process being performed by a primary electronic device. However, in some aspects, the process 300 can be considered as two separate processes. For example, in some implementations, blocks 302 and at least a portion of block 304 of the process 300 can be implemented as a separate configuration process. In some implementations, at least one or more of the blocks 304, 306, 308, 310, or 312 of the process 300 can be performed as a separate access restriction and monitoring process without departing from the scope of the present disclosure.

In some cases, the secondary electronic device may not be paired with the primary electronic device used for establishing access restriction conditions (e.g., at block 304). However, the access restriction conditions can still be used to restrict access to the secondary electronic device. In some cases, the secondary electronic device can be configured to perform at least a portion of the process 300 (e.g., an access restriction and monitoring process). For example, the secondary electronic device can be configured determine whether an access restriction condition is met (e.g., self-monitor status information associated with the secondary electronic device). In some cases, upon determining that an access restriction condition is met, the secondary electronic device can generate the action restriction event. In some cases, authorization for continued use may need to be provided by the primary user. In some cases, authorization for continued use can be provided from the same primary electronic device used to establish the access restriction conditions (e.g., at block 304). In some cases, the primary user can authorize continued use from another smart electronic device, different from the primary electronic device.

In some cases, providing user access restriction can reduce the chance that a particular secondary electronic device that is needed by the primary user will be unavailable due to a secondary user draining the battery. For example, the primary user may require a VR device to attend a virtual conference meeting at a particular time. In some cases, by restricting access to the VR device by secondary users, the primary user can increase the likelihood that the VR device will be available with sufficient battery at the particular time.

In some cases, a secondary electronic device (e.g., secondary electronic device 250 of FIG. 2) can be associated with a primary device (e.g., primary electronic device 200 of FIG. 2) during an initial setup of the secondary electronic device. In some cases, the primary electronic device can be used to establish access restriction conditions. In one illustrative example, the primary electronic device can include a user interface for selecting and/or adjusting access restriction conditions. In some cases, the secondary electronic device can provide system information such as battery level, location, user identification of a secondary user of the secondary electronic device or the like to the primary electronic device. In some aspects, the primary electronic device can determine whether any of the access restriction conditions are met based on the system information received from the secondary electronic device. In some examples, the access restriction event can include a notification. In some examples, the access restriction event can include disabling the secondary electronic device (e.g., causing the secondary electronic device to enter a standby mode). In some cases, user access for the secondary user can be restored when the primary device and/or primary user authorizes access. In one illustrative example, the primary user can authorize access by performing an authentication (e.g., a fingerprint, an access code, or the like). In some cases, if continued use of the secondary electronic device would result in the secondary electronic device being unavailable to the primary user at a specifically needed time, the primary user does not need to take any additional action or coordinate with the secondary user. In some cases, the prior established user access restriction conditions can ensure that the secondary electronic device will be available.

Figure 7:
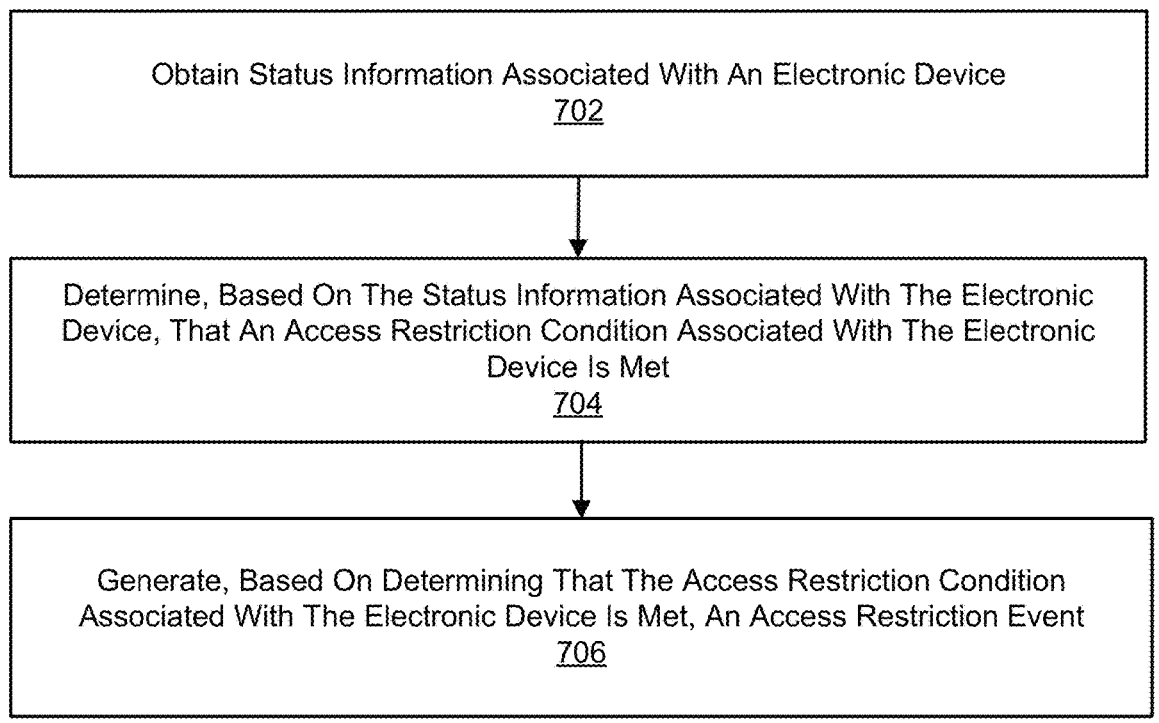
FIG. 7 is a flow diagram illustrating an example of a process for controlling access to an electronic device, in accordance with some examples.

FIG. 7 illustrates a flowchart of a process 700 for controlling access to an electronic device. In some cases, the process 700 can be performed by the electronic device associated with the status information (e.g., secondary electronic device 410, 420 of FIG. 4B, particular secondary electronic device 610 of FIG. 6A and FIG. 6B). In some cases, the process 700 can be performed by a primary electronic device, different from the electronic device (e.g., primary electronic device 400, particular secondary electronic device 600 of FIG. 6C). At block 702, the process 700 includes obtaining status information associated with an electronic device. In some cases, the status information associated with the electronic device includes a battery level of the electronic device.

At block 704, the process 700 includes determining, based on the status information associated with the electronic device, that an access restriction condition associated with the electronic device is met. In some examples, determining that the access restriction condition is met comprises determining that a battery level of the electronic device is below an access restriction battery threshold.

At block 706, the process 700 includes, generating, based on determining that the access restriction condition associated with the electronic device is met, an access restriction event. In some examples, generating, based on determining that the access restriction condition is met, the access restriction event, comprises at least partially disabling functionality of the electronic device. In some examples, disabling the electronic device comprises generating a standby request for the electronic device.

In some cases, the process 700 includes generating an authentication request associated with the access restriction event. In examples, the process 700 includes obtaining an authentication associated with the authentication request; and restoring, in response to the authentication, at least a portion of functionality of the electronic device disabled by the access restriction event.

In some cases, the process 700 is performed by a primary electronic device, and the electronic device is an electronic device associated with the primary electronic device. In some examples, enabling the electronic device comprises transmitting the authentication from the primary electronic device to the electronic device. In some examples, obtaining the authentication associated with the authentication request comprises obtaining a user authentication associated with a primary user of the electronic device.

In some cases, the process 700 includes determining that the battery level of the electronic device is above the access restriction battery threshold; permitting access to the electronic device, obtaining an additional battery level associated with the electronic device; determining that the additional battery level associated with the electronic device is below an additional access restriction battery threshold; and based on determining that the additional battery level is below the additional access restriction battery threshold, disabling the electronic device. In some cases, the access restriction battery threshold and the additional access restriction battery threshold are different. In some examples, the access restriction battery threshold and the additional access restriction battery threshold are equal.

In some cases, the electronic device is associated with a primary user and a secondary user that is different from the primary user. In some cases, the process 700 is performed by a primary electronic device associated with the primary user, and the electronic device is an electronic device associated with the primary electronic device. In some examples, the status information associated with the electronic device includes at least one of a battery level of the electronic device, a location of the electronic device, a time of day, or an identity of the secondary user.

In some implementations, the process 700 includes determining that the access restriction condition is met comprises determining at least one of: the battery level of the electronic device relative to an electronic device battery threshold, the location of the electronic device relative to one or more authorized use locations, the time of day relative to an electronic device use schedule; or an identity of the secondary user relative to a restricted user list associated with the electronic device.

In some examples, a device may include an application or function to perform some of the processes described herein (e.g., process 300, process 700 and/or any other process described herein). In some examples, the processes described herein (e.g., process 300, process 700 and/or any other process described herein) may be performed by a computing device or apparatus. In some examples, the process 300 and/or the process 700 can be performed by a computing device or system with the architecture of the computing system 800 shown in FIG. 8.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the processes 300, 700. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 300, 700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 300, 700 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
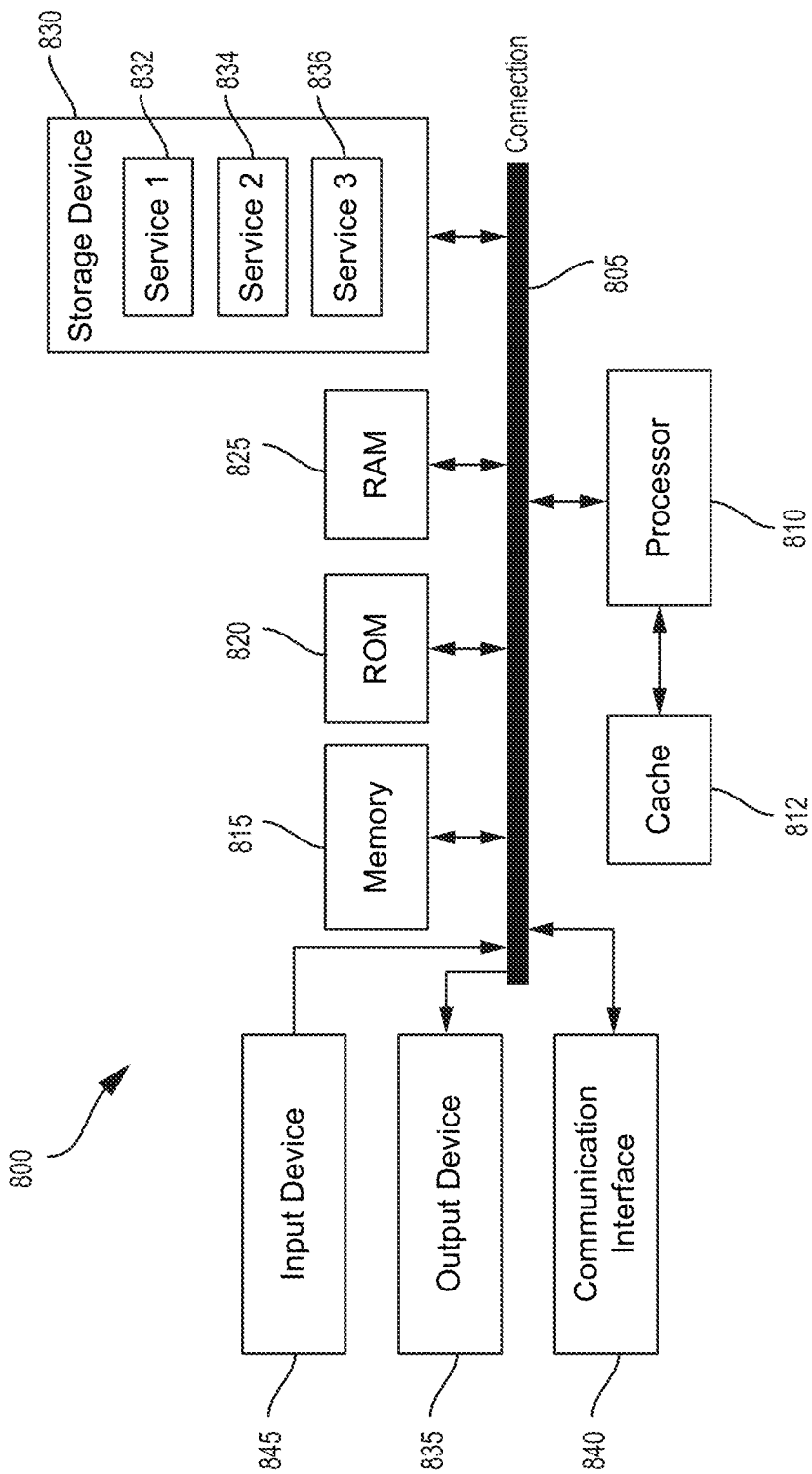
FIG. 8 is a diagram illustrating an example of a system for implementing certain aspects described herein.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for controlling access to an electronic device comprising: obtaining status information associated with an electronic device; determining, based on the status information associated with the electronic device, that an access restriction condition associated with the electronic device is met; and generating, based on determining that the access restriction condition associated with the electronic device is met, an access restriction event.

Aspect 2. The method of Aspect 1, wherein: the status information associated with the electronic device includes a battery level of the electronic device; and determining that the access restriction condition is met comprises determining that a battery level of the electronic device is below an access restriction battery threshold.

Aspect 3. The method of any of Aspects 1 to 2, further comprising: determining that the battery level of the electronic device is above the access restriction battery threshold; permitting access to the electronic device; obtaining an additional battery level associated with the electronic device; determining that the additional battery level associated with the electronic device is below an additional access restriction battery threshold; and based on determining that the additional battery level is below the additional access restriction battery threshold, disabling the electronic device.

Aspect 4. The method of any of Aspects 1 to 3, wherein the access restriction battery threshold and the additional access restriction battery threshold are different.

Aspect 5. The method of any of Aspects 1 to 4, wherein the access restriction battery threshold and the additional access restriction battery threshold are equal.

Aspect 6. The method of any of Aspects 1 to 5, wherein generating, based on determining that the access restriction condition is met, the access restriction event, comprises at least partially disabling functionality of the electronic device.

Aspect 7. The method of any of Aspects 1 to 6, wherein disabling the electronic device comprises generating a standby request for the electronic device.

Aspect 8. The method of any of Aspects 1 to 7, further comprising generating an authentication request associated with the access restriction event.

Aspect 9. The method of any of Aspects 1 to 8, further comprising: obtaining an authentication associated with the authentication request; and restoring, in response to the authentication, at least a portion of functionality of the electronic device disabled by the access restriction event.

Aspect 10. The method of any of Aspects 1 to 9, wherein the method is performed by a primary electronic device, and the electronic device is a secondary electronic device associated with the primary electronic device, and wherein enabling the secondary electronic device comprises transmitting the authentication from the primary electronic device to the electronic device.

Aspect 11. The method of any of Aspects 1 to 10, wherein obtaining the authentication associated with the authentication request comprises obtaining a user authentication associated with a primary user of the electronic device.

Aspect 12. The method of any of Aspects 1 to 11, further comprising obtaining, at the electronic device, an access restriction configuration message, wherein the access restriction configuration message includes at least one or more of the access restriction battery threshold or the additional access restriction battery threshold.

Aspect 13. The method of any of Aspects 1 to 12, wherein the electronic device is associated with a primary user and a secondary user that is different from the primary user.

Aspect 14. The method of any of Aspects 1 to 13, wherein the method is performed by a primary electronic device associated with the primary user, and the electronic device is a secondary electronic device associated with the primary electronic device.

Aspect 15. The method of any of Aspects 1 to 14, wherein the status information associated with the electronic device includes at least one of a battery level of the electronic device, a location of the electronic device, a time of day, or an identity of the secondary user.

Aspect 16. The method of any of Aspects 1 to 15, wherein determining that the access restriction condition is met comprises determining at least one of: the battery level of the electronic device relative to an electronic device battery threshold; the location of the electronic device relative to one or more authorized use locations; the time of day relative to an electronic device use schedule; or an identity of the secondary user relative to a restricted user list associated with the electronic device.

Aspect 17. The method of any of Aspects 1 to 16, wherein generating the access restriction event comprises transmitting an authentication request to a primary electronic device.

Aspect 18. An apparatus for controlling access to an electronic device comprising: a memory; and a processor coupled to the memory, the at least one processor configured to: obtain status information associated with an electronic device; determine, based on the status information associated with the electronic device, that an access restriction condition associated with the electronic device is met; and generate, based on determining that the access restriction condition associated with the electronic device is met, an access restriction event.

Aspect 19. The apparatus of Aspect 18, wherein: the status information associated with the electronic device includes a battery level of the electronic device; and to determine that the access restriction condition is met, the at least one processor is configured to determine that a battery level of the electronic device is below an access restriction battery threshold.

Aspect 20 The apparatus of any of Aspects 18 to 17, the at least one processor configured to: determine that the battery level of the electronic device is above the access restriction battery threshold; permit access to the electronic device; obtain an additional battery level associated with the electronic device; determine that the additional battery level associated with the electronic device is below an additional access restriction battery threshold; and based on determining that the additional battery level is below the additional access restriction battery threshold, disable the electronic device.

Aspect 21. The apparatus of any of Aspects 18 to 20, wherein the access restriction battery threshold and the additional access restriction battery threshold are different.

Aspect 22. The apparatus of any of Aspects 18 to 21, wherein the access restriction battery threshold and the additional access restriction battery threshold are equal.

Aspect 23. The apparatus of any of Aspects 18 to 22, wherein to generate, based on determining that the access restriction condition is met, the access restriction event, the at least one processor is configured to at least partially disable functionality of the electronic device.

Aspect 24. The apparatus of any of Aspects 18 to 23, wherein, to disable the electronic device, the at least one processor is configured to generate a standby request for the electronic device.

Aspect 25. The apparatus of any of Aspects 18 to 24, wherein the at least one processor is configured to generate an authentication request associated with the access restriction event.

Aspect 26. The apparatus of any of Aspects 18 to 25, wherein the at least one processor is configured to: obtain an authentication associated with the authentication request; and restore, in response to the authentication, at least a portion of functionality of the electronic device disabled by the access restriction event.

Aspect 27. The apparatus of any of Aspects 18 to 26, wherein the at least one processor is included in a primary electronic device, and the electronic device is a secondary electronic device associated with the primary electronic device, and wherein enabling the secondary electronic device comprises transmit the authentication from the primary electronic device to the electronic device.

Aspect 28. The apparatus of any of Aspects 18 to 27, wherein, to obtain the authentication associated with the authentication request, the at least one processor is configured to obtain a user authentication associated with a primary user of the electronic device.

Aspect 29. The apparatus of any of Aspects 18 to 27, wherein the at least one processor is configured to: obtain, at the electronic device, an access restriction configuration message, wherein the access restriction configuration message includes at least one or more of the access restriction battery threshold or the additional access restriction battery threshold.

Aspect 30. The apparatus of any of Aspects 18 to 29, wherein the electronic device is associated with a primary user and a secondary user that is different from the primary user.

Aspect 31. The apparatus of any of Aspects 18 to 30, wherein the at least one processor is included in a primary electronic device associated with the primary user, and the electronic device is a secondary electronic device associated with the primary electronic device.

Aspect 32. The apparatus of any of Aspects 18 to 31, wherein the status information associated with the electronic device includes at least one of a battery level of the electronic device, a location of the electronic device, a time of day, or an identity of the secondary user.

Aspect 33. The apparatus of any of Aspects 18 to 32, wherein, to determine that the access restriction condition is met, the at least one processor is configured to determine at least one of: the battery level of the electronic device relative to an electronic device battery threshold; the location of the electronic device relative to one or more authorized use locations; the time of day relative to an electronic device use schedule; or an identity of the secondary user relative to a restricted user list associated with the electronic device.

Aspect 34. The apparatus of any of Aspects 18 to 33 wherein, to generate the access restriction event, the at least one processor is configured to transmit an authentication request to a primary electronic device.

Aspect 35: A non-transitory computer-readable storage medium having stored thereon instructions which, when executed by one or more processors, cause the one or more processors to perform any of the operations of aspects 1 to 34.

Aspect 36: An apparatus comprising means for performing any of the operations of aspects 1 to 34.

What is claimed is:

1. A method for controlling access to an electronic device comprising:

obtaining a battery level associated with an electronic device;

determining, based on the battery level associated with the electronic device being below an access restriction battery threshold, that an access restriction condition associated with the electronic device is met, wherein the access restriction battery threshold is associated with a first user;

generating, based on determining that the access restriction condition associated with the electronic device is met, an access restriction event, wherein generating the access restriction event comprises at least partially disabling functionality of the electronic device;

obtaining an authentication associated with the access restriction event, wherein the authentication is associated with a second user, different from the first user;

restoring, in response to obtaining the authentication, at least a portion of functionality of the electronic device disabled by the access restriction event;

obtaining an additional battery level associated with the electronic device; and determining, based on the additional battery level associated with the electronic device being below an additional access restriction battery threshold, that an additional access restriction condition associated with the electronic device is met, wherein the additional access restriction battery threshold is associated with a third user, different from the first user and the second user.

2. The method of claim 1, wherein disabling functionality of the electronic device comprises generating a standby request for the electronic device.

3. The method of claim 1, wherein generating the access restriction event comprises generating an authentication request associated with the access restriction event.

4. The method of claim 1, wherein the method is performed by a primary electronic device, and the electronic device is a secondary electronic device associated with the primary electronic device, and wherein enabling the secondary electronic device comprises transmitting the authentication from the primary electronic device to the electronic device.

5. The method of claim 1, wherein obtaining the authentication associated with the access restriction event comprises obtaining a user authentication associated with a primary user of the electronic device.

6. The method of claim 1, further comprising:

determining that the battery level of the electronic device is above the access restriction battery threshold;

permitting access to the electronic device;

obtaining an additional battery level associated with the electronic device;

determining that the additional battery level associated with the electronic device is below an additional access restriction battery threshold; and based on determining that the additional battery level is below the additional access restriction battery threshold, disabling functionality of the electronic device.

7. The method of claim 6, wherein the access restriction battery threshold and the additional access restriction battery threshold are different.

8. The method of claim 6, wherein the access restriction battery threshold and the additional access restriction battery threshold are equal.

9. The method of claim 6, further comprising:

obtaining, at the electronic device, an access restriction configuration message, wherein the access restriction configuration message includes at least one or more of the access restriction battery threshold or the additional access restriction battery threshold.

10. The method of claim 1, wherein the electronic device is associated with a primary user and a secondary user that is different from the primary user.

11. The method of claim 10, wherein the method is performed by a primary electronic device associated with the primary user, and the electronic device is a secondary electronic device associated with the primary electronic device.

12. The method of claim 10, wherein the access restriction condition associated with the electronic device is based on at least one of a battery level of the electronic device, a location of the electronic device, a time of day, or an identity of the secondary user.

13. The method of claim 12, wherein determining that the access restriction condition is met comprises determining at least one of:
the battery level of the electronic device relative to an electronic device battery threshold;
the location of the electronic device relative to one or more authorized use locations;
the time of day relative to an electronic device use schedule; or
an identity of the secondary user relative to a restricted user list associated with the electronic device.

14. The method of claim 1, wherein generating the access restriction event comprises transmitting an authentication request to a primary electronic device.

15. The method of claim 1, further comprising:
obtaining an additional battery level associated with the electronic device;
determining that the additional battery level associated with the electronic device is below an additional access restriction battery threshold; and
based on determining that the additional battery level is below the additional access restriction battery threshold, disabling functionality of the electronic device.

16. The method of claim 1, further comprising:
generating, based on determining that the additional access restriction condition associated with the electronic device is met, an additional access restriction event;
obtaining an additional authentication associated with the additional access restriction event; and
restoring, in response to obtaining the additional authentication, at least a portion of additional functionality of the electronic device disabled by the additional access restriction event.

17. An apparatus for controlling access to an electronic device comprising:
a memory; and
at least one processor coupled to the memory, the at least one processor configured to:
obtain a battery level associated with an electronic device;
determine, based on the battery level associated with the electronic device being below an access restriction battery threshold, that an access restriction condition associated with the electronic device is met, wherein the access restriction battery threshold is associated with a first user;
generate, based on determining that the access restriction condition associated with the electronic device is met, an access restriction event, wherein generating the access restriction event comprises at least partially disabling functionality of the electronic device;
obtain an authentication associated with the access restriction event, wherein the authentication is associated with a second user, different from the first user;
restore, in response to obtaining the authentication, at least a portion of functionality of the electronic device disabled by the access restriction event;
obtain an additional battery level associated with the electronic device; and
determine, based on the additional battery level associated with the electronic device being below an additional access restriction battery threshold, that an additional access restriction condition associated with the electronic device is met, wherein the additional access restriction battery threshold is associated with a third user, different from the first user and the second user.

18. The apparatus of claim 17, wherein, to disable functionality of the electronic device, the at least one processor is configured to generate a standby request for the electronic device.

19. The apparatus of claim 17, wherein the at least one processor is configured to generate an authentication request associated with the access restriction event.

20. The apparatus of claim 17, wherein the at least one processor is included in a primary electronic device, and the electronic device is a secondary electronic device associated with the primary electronic device, and wherein enabling the secondary electronic device comprises transmit the authentication from the primary electronic device to the electronic device.

21. The apparatus of claim 17, wherein, to obtain the authentication associated with the access restriction event, the at least one processor is configured to obtain a user authentication associated with a primary user of the electronic device.

22. The apparatus of claim 17, the at least one processor configured to:
determine that the battery level of the electronic device is above the access restriction battery threshold;
permit access to the electronic device;
obtain an additional battery level associated with the electronic device;
determine that the additional battery level associated with the electronic device is below an additional access restriction battery threshold; and
based on determining that the additional battery level is below the additional access restriction battery threshold, disable the electronic device.

23. The apparatus of claim 22, wherein the access restriction battery threshold and the additional access restriction battery threshold are different.

24. The apparatus of claim 22, wherein the access restriction battery threshold and the additional access restriction battery threshold are equal.

25. The apparatus of claim 22, wherein the at least one processor is configured to:
obtain, at the electronic device, an access restriction configuration message, wherein the access restriction configuration message includes at least one or more of the access restriction battery threshold or the additional access restriction battery threshold.

26. The apparatus of claim 17, wherein the electronic device is associated with a primary user and a secondary user that is different from the primary user.

27. The apparatus of claim 26, wherein the at least one processor is included in a primary electronic device associated with the primary user, and the electronic device is a secondary electronic device associated with the primary electronic device.

28. The apparatus of claim 26, wherein the access restriction condition associated with the electronic device is based on at least one of a battery level of the electronic device, a location of the electronic device, a time of day, or an identity of the secondary user.

29. The apparatus of claim 28, wherein, to determine that the access restriction condition is met, the at least one processor is configured to determine at least one of:
- the battery level of the electronic device relative to an electronic device battery threshold;
- the location of the electronic device relative to one or more authorized use locations;
- the time of day relative to an electronic device use schedule; or
- an identity of the secondary user relative to a restricted user list associated with the electronic device.

30. The apparatus of claim 17, wherein, to generate the access restriction event, the at least one processor is configured to transmit an authentication request to a primary electronic device.

31. The apparatus of claim 17, wherein the at least one processor is configured to:
- obtain an additional battery level associated with the electronic device;
- determine that the additional battery level associated with the electronic device is below an additional access restriction battery threshold; and
- based on determining that the additional battery level is below the additional access restriction battery threshold, disable functionality of the electronic device.

32. The apparatus of claim 17, wherein the at least one processor is configured to:
- generate, based on determining that the additional access restriction condition associated with the electronic device is met, an additional access restriction event;
- obtain an additional authentication associated with the additional access restriction event; and
- restore, in response to obtaining the additional authentication, at least a portion of additional functionality of the electronic device disabled by the additional access restriction event.

* * * * *